(12) United States Patent
Kadous et al.

(10) Patent No.: US 8,386,422 B1
(45) Date of Patent: Feb. 26, 2013

(54) USING CONSTRUCTED PATHS TO SUPPLEMENT MAP DATA

(75) Inventors: Mohammed Waleed Kadous, Sunnyvale, CA (US); Andrew Lookingbill, Palo Alto, CA (US); Sebastian Thrun, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/178,941

(22) Filed: Jul. 8, 2011

(51) Int. Cl.
*G06F 17/00* (2006.01)
*H04W 24/00* (2009.01)

(52) U.S. Cl. .................................. 707/609; 455/456.1

(58) Field of Classification Search .............. 707/609; 701/454; 455/456.1
See application file for complete search history.

(56) References Cited

U.S. PATENT DOCUMENTS

| | | | |
|---|---|---|---|
| 6,009,359 A | 12/1999 | El-Hakim et al. | |
| 7,069,124 B1 | 6/2006 | Whittaker et al. | |
| 7,312,752 B2 | 12/2007 | Smith et al. | |
| 7,417,544 B2 * | 8/2008 | Artem et al. ............... | 340/572.1 |
| 7,443,298 B2 | 10/2008 | Cole et al. | |
| 7,471,243 B2 | 12/2008 | Roslak | |
| 7,532,113 B2 | 5/2009 | Horvitz et al. | |
| 7,598,865 B2 | 10/2009 | Zhang et al. | |
| 7,620,493 B2 | 11/2009 | Stankiewicz et al. | |
| 7,679,561 B2 | 3/2010 | Elwell, Jr. et al. | |
| 7,791,538 B2 | 9/2010 | Yanagihara | |
| 7,898,977 B2 | 3/2011 | Roese et al. | |
| 2002/0055817 A1 | 5/2002 | Chou | |
| 2005/0130677 A1 | 6/2005 | Meunier et al. | |
| 2005/0143091 A1 | 6/2005 | Shapira et al. | |
| 2006/0069526 A1 | 3/2006 | Kaiser et al. | |
| 2007/0188318 A1 | 8/2007 | Cole et al. | |
| 2007/0271011 A1 | 11/2007 | Lee et al. | |

(Continued)

FOREIGN PATENT DOCUMENTS

| EP | 2099240 A1 | 9/2009 |
|---|---|---|
| WO | 2009021068 A1 | 2/2009 |

(Continued)

OTHER PUBLICATIONS

"Kidnapped Robot Problem" [online]. [Retrieved Feb. 16, 2011] Retrieved from the Internet: <http://en.wikipedia.org/wiki/Kidnapped_robot_problem, 1 page.

(Continued)

*Primary Examiner* — Miranda Le
(74) *Attorney, Agent, or Firm* — Lerner, David, Littenberg, Krumholz & Mentlik, LLP

(57) ABSTRACT

Aspects of the present disclosure relate generally to indoor localization, for example, where GPS or other localization signals are unavailable. More specifically, aspects relate to using a particle filter in conjunction with one or more orientation devices to identify a location of a client device with respect to a map of an indoor space. This location may then be used to identify the path of the client device through the indoor space. The paths of a plurality of different client devices through the same indoor space may be used to update the map based on common patterns or inconsistencies between the map and the paths of the plurality of client devices.

23 Claims, 15 Drawing Sheets

U.S. PATENT DOCUMENTS

| | | | |
|---|---|---|---|
| 2008/0161011 A1* | 7/2008 | Babin et al. | 455/456.1 |
| 2008/0180637 A1 | 7/2008 | Kjeldsen et al. | |
| 2009/0005975 A1 | 1/2009 | Forstall et al. | |
| 2009/0043504 A1 | 2/2009 | Bandyopadhyay et al. | |
| 2009/0102719 A1* | 4/2009 | Lin | 342/450 |
| 2009/0201149 A1* | 8/2009 | Kaji | 340/539.13 |
| 2009/0291641 A1 | 11/2009 | Sato et al. | |
| 2010/0011022 A1 | 1/2010 | Sugimoto et al. | |
| 2010/0026569 A1 | 2/2010 | Amidi | |
| 2010/0049431 A1 | 2/2010 | Zetune | |
| 2010/0070078 A1 | 3/2010 | Kong et al. | |
| 2010/0121488 A1 | 5/2010 | Lee et al. | |
| 2010/0127935 A1 | 5/2010 | Huang et al. | |
| 2010/0159958 A1 | 6/2010 | Naguib et al. | |
| 2010/0246405 A1 | 9/2010 | Potkonjak | |
| 2010/0279712 A1* | 11/2010 | Dicke et al. | 455/456.5 |
| 2011/0082638 A1 | 4/2011 | Khorashadi et al. | |
| 2011/0211563 A1* | 9/2011 | Herrala et al. | 370/338 |
| 2012/0086599 A1* | 4/2012 | Mo et al. | 342/357.31 |

FOREIGN PATENT DOCUMENTS

| | | | |
|---|---|---|---|
| WO | 2010067348 A1 | 6/2010 | |
| WO | 2010106530 A2 | 9/2010 | |
| WO | 2011042727 A2 | 4/2011 | |

OTHER PUBLICATIONS

Adam Milstein, Occupancy Grid Maps for Localization and Mapping, Jun. 2008, 28 pages.

Juan D. Tardos, Jose Neira, Maria De Luna, Paul M. Newman, John J. Leonard, Robust Mapping and Localization in Indoor Environments Using Sonar Data, Jun. 24, 2002, 39 pages.

Lasse Klingbeil and Tim Wark, A Wireless Sensor Network for Real-Time Indoor Localisation and Motion Monitoring, 2008, 12 pages, IEEE Computer Society.

M. Sanjeev Arulampalam, Simon Maskell, Neil Gordon, and Tim Clapp, A Tutorial on Particle Filters for Online Nonlinear/Non-Gaussian Bayesian Tracking, 2002, 15 pages.

Paramvir Bahl and Venkata N. Padmanabhan, Radar: An In-Building RF-Based User Location and Tracking System, 2008, 10 pages.

Siddhartha Saha, Kamalika Chaudhuri, Dheeraj Sanghi, Pravin Bhagwat, Location Determination of a Mobile Device Using IEEE 802.11b Access Point Signals, 2003, 6 pages.

Yiming Ji, Saad Biaz, Santosh Pandey, Prathima Agrawal, Ariadne: A Dynamic Indoor Signal Map Construction and Localization System, Jun. 19, 2006, 14 pages.

International Search Report and Written Opinion for Application No. PCT/US2012/037235 dated Aug. 29, 2012.

* cited by examiner

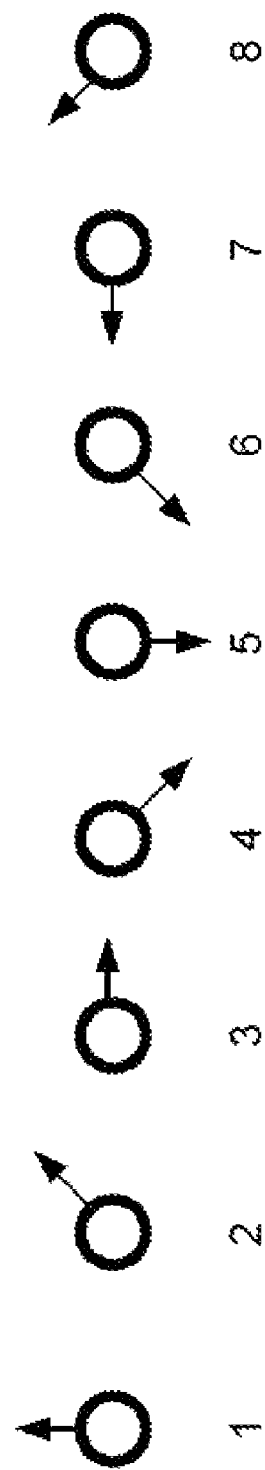

| Child Particle | Location | Heading | Parent | Parent Location (at sampling) | Parent Heading (at sampling) | Parent Original Location | Parent Original Heading | Grand Parent | Grand Parent Location (at sampling) | Grand Parent Heading (at sampling) |
|---|---|---|---|---|---|---|---|---|---|---|
| Child 1 | (x1'+Δxp+σx, y1'+Δyp+σy) | h1'+Δhp+σh | Parent 1 | (x1'+Δxp, y1'+Δyp) | h1'+Δhp | (x1+σx, y1+σy) or (y',x') | h1+σh or h1' | Grand Parent 1 | (x1,y1) | h1 |
| Child 2 | (x1'+Δxp+σx, y1'+Δyp+σy) | h1'+Δhp+σh | Parent 1 | (x1'+Δxp, y1'+Δyp) | h1'+Δhp | (x1+σx, y1+σy) or (y',x') | h1+σh or h1' | Grand Parent 1 | (x1,y1) | h1 |
| Child 3 | (x3'+Δxp+σx, y3'+Δyp+σy) | h3'+Δhp+σh | Parent 3 | (x3'+Δxp, y3'+Δyp) | h3'+Δhp | (x3+σy, y3+σy) or (x3',y3') | h3+σh or h3' | Grand Parent 3 | (x3,y3) | h3 |
| Child 4 | (x4'+Δxp+σx, y4'+Δyp+σy) | h4'+Δhp+σh | Parent 4 | (x4'+Δxp, y4'+Δyp) | h4'+Δhp | (x4+σx, y4+σy) or (x4',y') | h4+σh or h4' | | | |
| Child 5 | (x4'+Δxp+σx, y4'+Δyp+σy) | h4'+Δhp+σh | Parent 4 | (x4'+Δxp, y4'+Δyp) | | | | | | |
| Child 6 | (x3'+Δxp+σx, y3'+Δyp+σy) | h3'+Δhp+σh | Parent 3 | (x3'+Δxp, y3'+Δyp) | | | | | | |

```
Block 1314 of
FIGURE 13A
        │
        ▼
Select a plurality of the particles of the first [next]
set of particles based on the associated likelihood
1316                    values
        │
        ▼
Generate a [next] new set of particles by
adjusting the representative location (and
heading) associated with the selected particles by
1318         a selected value
        │
        ▼
For each particle of the [next] new set of particles,
store information identifying the selected particle
of the previous set used to generate the particular
1320                    particle
        │
        ▼
      1322
YES ◄── All particles of the [next] set ──► NO
      within a threshold radius?
 │                                           │
 ▼                                           ▼
Determine a mean representative location    Block 1306 of
     of the [next] set of particles          FIGURE 13A
1324
 │
 ▼
Select a particle of the [next] set of particles
representing the location closest to the mean
            representative location
1326
 │
 ▼
Determine a path of the client device through the
indoor space based in the information identifying   Block 1330 of
the selected particle(s) of the previous set(s) used ──► FIGURE 13C
1328    to generate the selected particle
```

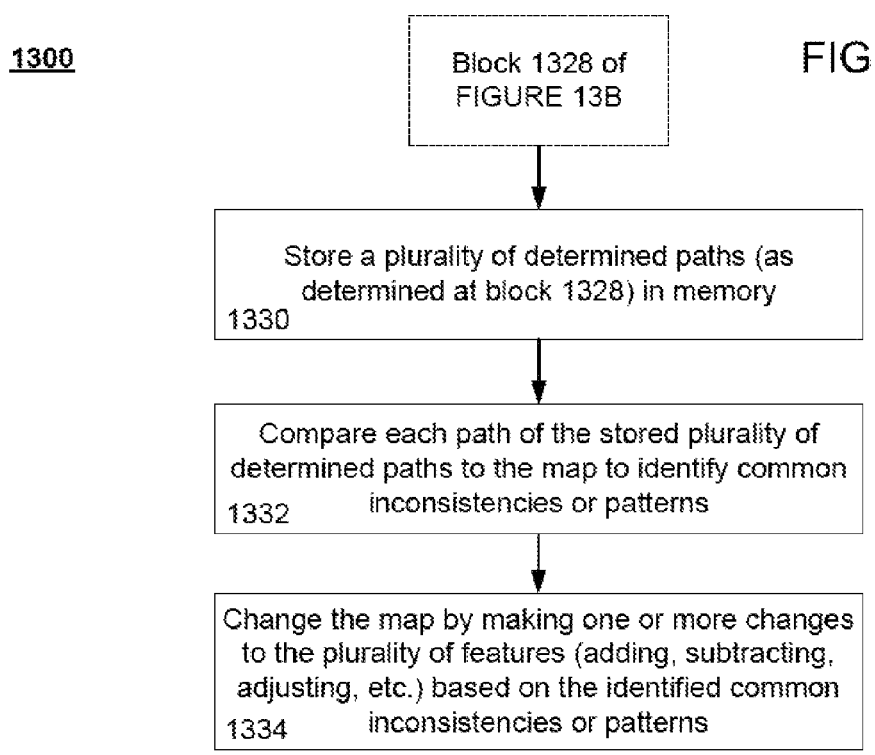

USING CONSTRUCTED PATHS TO SUPPLEMENT MAP DATA

CROSS-REFERENCE TO RELATED APPLICATIONS

This application is related to co-pending U.S. patent application Ser. No. 13/179,147, entitled "CONSTRUCTING PATHS BASED ON A PARTICLE MODEL," filed concurrently herewith, the entire disclosure of which is incorporated herein by reference.

BACKGROUND

Various navigation systems provide users with turn-by-turn directions. These systems include handheld GPS devices, mobile phones, or vehicle-mounted devices. A user inputs one or more locations and receives a route and turn-by-turn directions based on the inputted locations. The user may follow the turn-by-turn directions to reach the one or more locations.

These navigation systems rely on the ability to receive information from a plurality of GPS satellites. This allows for identification of a current location of a device for providing navigational assistance. However, while indoors, a mobile device may require accurate localization to enable features such as advanced indoor navigation, for example, to conference rooms in a building or stores within a mall. In an indoor environment, accurate localization is difficult due to the lack of adequate signals from the GPS satellites.

In the field of robotics, particle filters or other probabilistic approaches may be used to identify the location of a robot which has no information regarding its location other than a map. This is generally referred to as the "kidnapped robot problem." These robots use sophisticated cameras and lasers to take measurements. These measurements are used in conjunction with the particle filter to reduce the number of possible map locations until only a single possible location is left. However, while many modern smart phones incorporate a significant amount of technological advancements, they typically do not include the sophisticated cameras and lasers generally utilized to solve the kidnapped robot problem.

SUMMARY

One aspect of the disclosure provides a method of updating a map of an indoor space the map being based on a plurality of features. The method includes determining a plurality of paths of a portable handheld device through the indoor space. Determining each particular path of the plurality includes generating, by a processor, a first set of particles, each particle of the first set of particles representing a location on the map and being associated with a likelihood value; receiving data from one or more orientation devices; determining a direction and speed of movement based on the received data; applying the direction and speed of movement to each one of the first set of particles; adjusting the likelihood value of each particle of the first set of particles, based on whether the particular particle violated one or more of the plurality of features; generating a second set of particles by selecting particles of the first set of particles based on the likelihood values associated with the first set of particles and adjusting the representative locations of the selected particles of the first set by a minimal value; for each particular particle of the second set of particles, storing information identifying the particle of the first set selected to generate the particular particle of the second set; if all of the particles of the second set of particles are within a threshold radius of one another, selecting a given particle of the second set of particles closest to an average representative location of the second set of particles; and determining the particular path based on the stored information identifying the particle of the first set selected to generate the selected given particle of the second set. The method also includes storing the plurality of determined paths in memory; comparing each path of the stored plurality of determined paths to the map to identify common patterns; and updating the map by making one or more changes to the plurality of features based on the identified common patterns.

In one example, the plurality of features are walls which define areas where a user may not pass through. In another example, the one or more changes include adding a wall to the map. In another example, the one or more changes include adjusting a wall. In another example, the one or more changes include adding a feature representing an object to the map. In another example, the plurality of features are rails which define areas where a user is permitted to go. In another example, the one or more changes include adding a rail to the map. In another example, the one or more changes include adjusting a rail. In another example, each particle of the first set of particles further represents a device heading, and the method also includes identifying a heading based on the received data and adjusting the likelihood value of each particular particle of the first set of particles based on whether the heading associated with each particular particle is associated with a heading consistent with the identified heading. In another example, the first set of particles and the second set of particles each includes the same number of particles. In another example, each particle of the first set of particles further represents a possible heading of the portable handheld device, and the method also includes, for each particular particle of the second set of particles, storing information identifying the representative heading of the particle of the first set selected to generate the particular particle. In another example, the method also includes, for each particular particle of the second set of particles, storing information identifying the representative location of the particle of the first set selected to generate the particular particle of the second set.

Another aspect of the disclosure provides a device for updating a map of an indoor space the map being based on a plurality of features. The device includes memory storing the map of the indoor space and a processor coupled to the memory. The processor is operable to determine a plurality of paths of a portable handheld device through the indoor space. The processor is operable to determine each path of the plurality of paths by generating a first set of particles, each particle of the first set of particles representing a location on the map and being associated with a likelihood value; receiving data from one or more orientation devices; determining a direction and speed of movement based on the received data; applying the direction and speed of movement to each one of the first set of particles; adjusting the likelihood value of each particle of the first set of particles, based on whether the particular particle violated one or more of the plurality of features; generating a second set of particles by selecting particles of the first set of particles based on the likelihood values associated with the first set of particles and adjusting the representative locations of the selected particles of the first set by a minimal value; for each particular particle of the second set of particles, storing information identifying the particle of the first set selected to generate the particular particle of the second set; if all of the particles of the second set of particles are within a threshold radius of one another, selecting a given particle of the second set of particles closest to an average representative location of the second set of particles; and determining the particular path based on the stored information identifying the particle of the first set selected to generate the selected given particle of the second set. The processor is further operable to store the plurality of determined paths in memory, compare each path of the stored plurality of determined paths to the map to identify common patterns, and update the map by making one or more changes to the plurality of features based on the identified common patterns.

In one example, the plurality of features are walls which define areas where a user may not pass through. In another example, the one or more changes include adding a wall to the map. In another example, the one or more changes include adjusting a wall. In another example, the one or more changes include adding a feature representing an object to the map. In another example, the plurality of features are rails which define areas where a user is permitted to go. In another example, the one or more changes include adding a rail to the map. In another example, the one or more changes include adjusting a rail. In another example, each particle of the first set of particles further represents a device heading, and the processor is also operable to identify a heading based on the received data and adjust the likelihood value of each particular particle of the first set of particles based on whether the heading associated with each particular particle is associated with a heading consistent with the identified heading. In another example, the first set of particles and the second set of particles each includes the same number of particles. In another example, each particle of the first set of particles further represents a possible heading of the portable handheld device, and the processor is also operable to, for each particular particle of the second set of particles, store, in the memory, information identifying the representative heading of the particle of the first set selected to generate the particular particle. In another example, the processor is further operable to, for each particular particle of the second set of particles, store, in the memory, information identifying the representative location of the particle of the first set selected to generate the particular particle of the second set.

Yet another aspect of the invention provides a tangible, non-transitory, computer-readable storage medium on which computer readable instructions of a program are stored. The instructions, when executed by a processor, cause the processor to perform a method of updating a map of an indoor space the map being based on a plurality of features. The method includes determining a plurality of paths of a portable handheld device through the indoor space. Determining each particular path of the plurality includes generating, by a processor, a first set of particles, each particle of the first set of particles representing a location on the map and being associated with a likelihood value; receiving data from one or more orientation devices; determining a direction and speed of movement based on the received data; applying the direction and speed of movement to each one of the first set of particles; adjusting the likelihood value of each particle of the first set of particles, based on whether the particular particle violated one or more of the plurality of features; generating a second set of particles by selecting particles of the first set of particles based on the likelihood values associated with the first set of particles and adjusting the representative locations of the selected particles of the first set by a minimal value; for each particular particle of the second set of particles, storing information identifying the particle of the first set selected to generate the particular particle of the second set; if all of the particles of the second set of particles are within a threshold radius of one another, selecting a given particle of the second set of particles closest to an average representative location of the second set of particles; and determining the particular path based on the stored information identifying the particle of the first set selected to generate the selected given particle of the second set. The method also includes storing the plurality of determined paths in memory; comparing each path of the stored plurality of determined paths to the map to identify common patterns; and updating the map by making one or more changes to the plurality of features based on the identified common patterns.

In one example, the plurality of features are walls which define areas where a user may not pass through. In another example, the one or more changes include adding a wall to the map. In another example, the one or more changes include adjusting a wall. In another example, the one or more changes include adding a feature representing an object to the map. In another example, the plurality of features are rails which define areas where a user is permitted to go. In another example, the one or more changes include adding a rail to the map. In another example, the one or more changes include adjusting a rail. In another example, each particle of the first set of particles further represents a device heading, and the method also includes identifying a heading based on the received data and adjusting the likelihood value of each particular particle of the first set of particles based on whether the heading associated with each particular particle is associated with a heading consistent with the identified heading. In another example, the first set of particles and the second set of particles each includes the same number of particles. In another example, each particle of the first set of particles further represents a possible heading of the portable handheld device, and the method also includes, for each particular particle of the second set of particles, storing information identifying the representative heading of the particle of the first set selected to generate the particular particle. In another example, the method also includes, for each particular particle of the second set of particles, storing information identifying the representative location of the particle of the first set selected to generate the particular particle of the second set.

BRIEF DESCRIPTION OF THE DRAWINGS

FIG. 6 illustrates particles in accordance with an exemplary embodiment.

FIG. 7 is a table of an indoor space in accordance with an exemplary embodiment.

FIGS. 13A-13C are a flow diagram in accordance with an exemplary embodiment.

DETAILED DESCRIPTION

Figure 1:
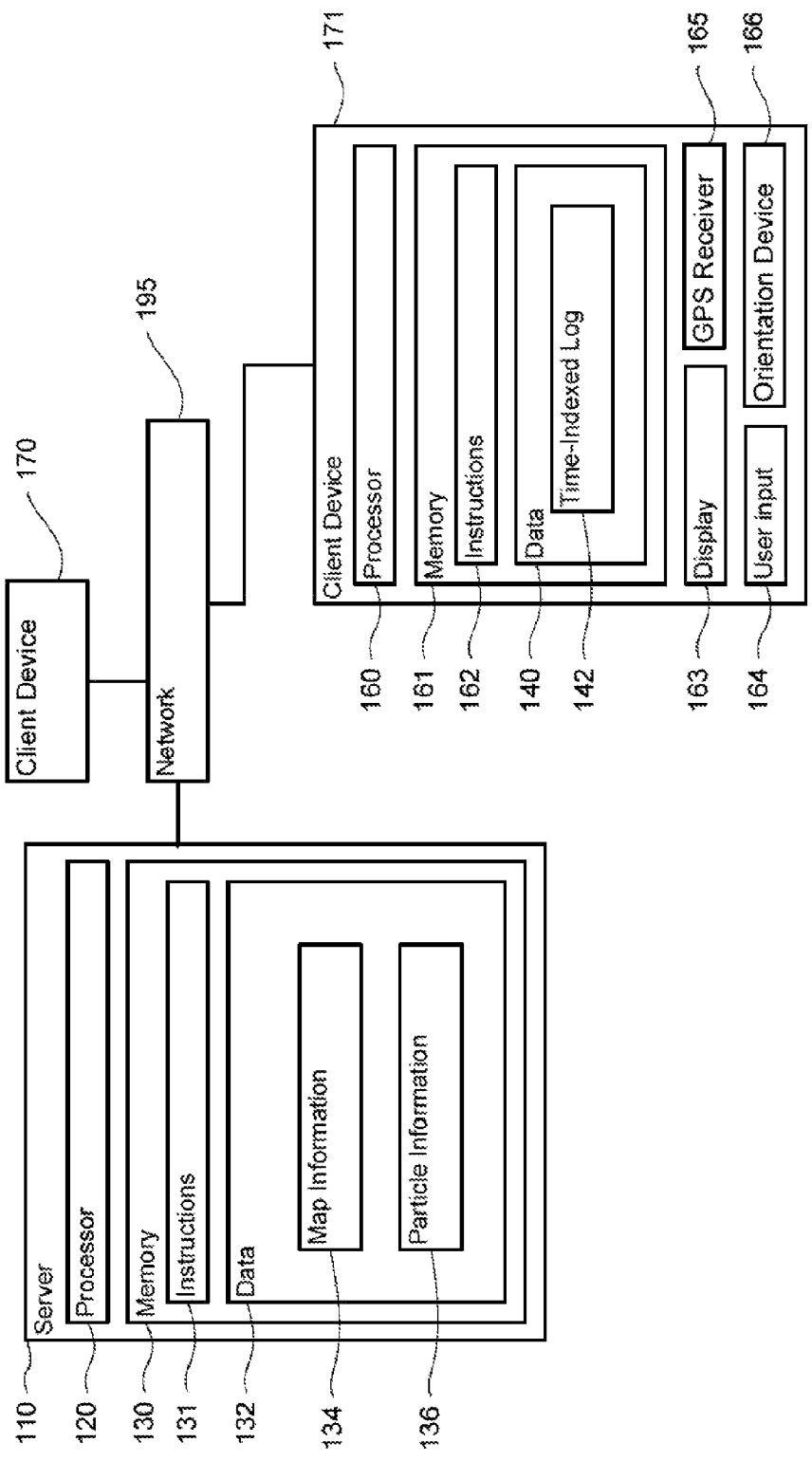
FIG. 1 is a functional diagram of a system in accordance with an exemplary embodiment.

A map of an indoor location including a plurality of features may be identified by a server. The features may include walls or rails. The map may be populated with a plurality of particles. Each particle may represent a possible location of the client device with respect to the map. In some examples, the particles may also represent a possible heading of the client device. Each particle may also be associated with a likelihood value indicative of how likely it is that the client device is at the representative location.

The server may access a time-indexed log including data from one or more orientation devices. The orientation devices may include for example, accelerometers, gyroscopes, compasses, etc. The time-indexed log may be used to determine a direction of movement (a heading) and a speed of movement. The determined direction and speed may be applied to each of the plurality of particles. The likelihood value associated with each particular particle may be then adjusted based on whether the particular particle would violate a constraint of a feature of the map, for example by contacting or moving through a wall or moving off of a rail. In some examples, the likelihood values may be adjusted based on whether the particles' headings are consistent with the determined heading. As described below, other signals may also be used to adjust the likelihood values.

It may then be determined whether it is time to resample. For example, the server or client device may determine whether or not a step has been taken or whether some period of time has passed based on the time-indexed log. If not, additional data from the one or more orientation devices may be examined. If it is time to resample, a plurality of particles of the first set of particles may be selected based on the associated likelihood values. A new set of particles may be generated by adjusting the representative location (and in some examples, heading) of the selected particles by some minimal value. For each particle of the new (or next new) set of particles, information identifying the selected particle of the previous set used to generate the particular particle may be stored.

It may then be determined whether all of the particles of the next set of particles are within some threshold distance from one another or threshold radius. If not, additional data may be received from the orientation device. If all of the particles of the next set are within a threshold radius, a mean representative location of the particles of the next set of particles may be determined. The particle representing the location closest to the mean representative location may then be selected. A path through the indoor space may be determined based on the information identifying the selected particle or particles of the previous set or sets used to generate the selected particle.

The server may store a plurality of determined paths in memory. Each path of the stored plurality of determined paths may be compared to the map in order to identify common inconsistencies or patterns. The map may be then changed, by making one or more changes to the plurality of features based on the identified common inconsistencies or patterns. For example, the feature changes may include adding, subtracting, adjusting the features etc.

Figure 2:
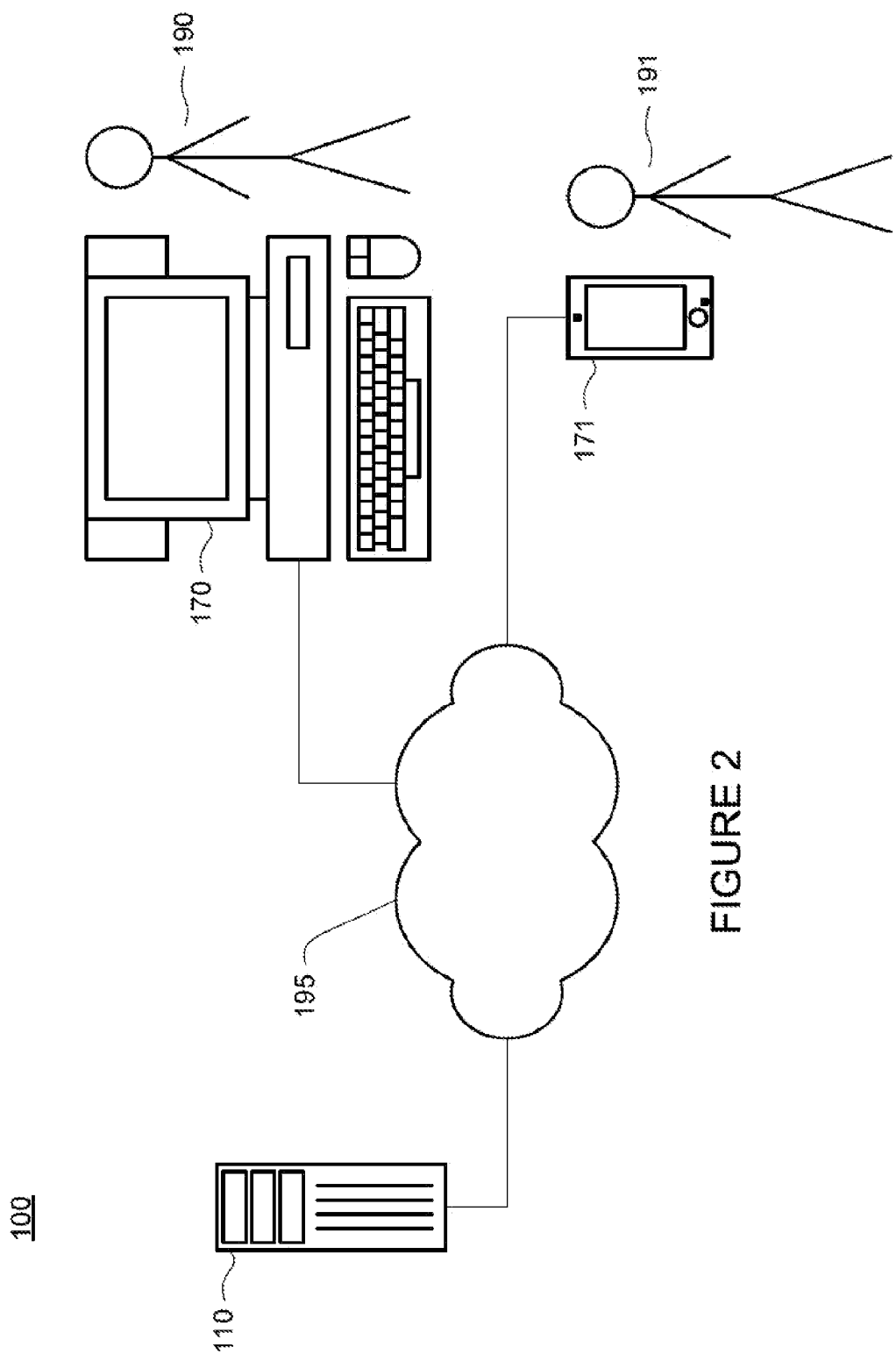
FIG. 2 is a pictorial diagram of the system of FIG. 1.

As shown in FIGS. 1-2, an exemplary system 100 may include computers 110, 170, and 171. Computer 110 may contain a processor 120, memory 130 and other components typically present in general purpose computers.

Memory 130 of computer 110 stores information accessible by processor 120, including instructions 131 that may be executed by the processor 120. Memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as commercially available processors. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 132 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display of client device 170. Server 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

Each client device may be configured similarly to the server 110, with a processor 160, memory 161, instructions 162, and data 140. Each client computer 170-71 may be a personal computer, intended for use by a person 190-91, having all the internal components normally found in a personal computer such as a central processing unit (CPU), display device 163 (for example, a monitor having a screen, a projector, a touch-screen, a small LCD screen, a television, or another device such as an electrical device that is operable to display information processed by the processor), CD-ROM, hard-drive, user input 164 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the computers 170-71 may comprise a full-sized personal computer, the system and method may also be used in connection with mobile devices capable of wirelessly exchanging data with a server over a network such as the Internet. By way of example only, client device 171 may be a wireless-enabled PDA, hand-held or in-car navigation device, tablet PC, netbook, or a cellular phone capable of obtaining information via the Internet. The user may input information, for example, using a small keyboard, a keypad, or a touch screen.

The server 110 and client computers 170-71 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a single client device having a single processor, various aspects of the system and method may be implemented by a plurality of computers, for example, communicating information over network 195.

As shown in FIG. 1, the client devices may also include geographic position component 165, to determine the geographic location. For example, client device 170 may include a GPS receiver to determine the device's latitude, longitude and altitude position. Thus, as the client device changes location, for example by being physically moved, the GPS receiver may determine a new current location. The component 165 may also comprise software for determining the position of the device based on other signals received at the client device 170, such as signals received at a cell phone's antennas from one or more cell phone towers if the client device is a cell phone.

Client device 171 may also include an orientation device 166, such as an accelerometer, gyroscope, compass, or any combination of these, to determine the direction in which the device is oriented. For example, an accelerometer may be used to detect the effect of gravity on the client device measured, for example, in meters per second per second. By way of example only, the client device may use input from the accelerometer to determine the client device's pitch, yaw or roll (or changes thereto) relative to the direction of gravity or a plane perpendicular thereto. In that regard, it will be understood that a client device's provision of orientation data as set forth herein may be provided automatically to the client device.

The orientation data received from the orientation device may be used in various ways. For example, an accelerometer or gyroscope may be used as a pedometer by running an average of the acceleration values to identify which direction is down (towards the Earth). A simple step detector may be constructed by deciding a step has been taken each time the component in the down direction is greater than an empirically-determined threshold. The distance of each step may be approximated by using an approximate stride length or speed of a person.

The server may access map information 134. As described in more detail below, the map information may include a series of maps representing the spaces within a building. In one example, the map information may be based upon a series of walls representing locations where a user may not walk (or is not able to walk) within a building. In another example, the map information may be based upon a series of rails representing locations where a user may walk within a building.

The server may also access particle information 136. The particle information may include a plurality of representative particles or data points. Each particle may be associated with state information corresponding to a possible state of the client device. For example, a particular particle may be associated with an identifier, a location coordinate, and heading information. As described in more detail below, the state information may be manipulated based upon information received from an accelerometer, compass, pedometer, etc. In another example, particle information may also be stored or accessible by the client device.

Data 140 of client device 171 may store a time-indexed log 142 of measurements from one or more orientation devices and wireless network access point identifiers. For example, the log may include a timestamp, orientation and compass measurements, wireless network access point identifiers (MAC address and/or SSIDs), and signal strengths. Again, this data need not include any payload information, but only that necessary to identify a wireless network access point (or other wireless network identifier) and its associated signal strength. For every unit of time along the route, the client device may record a log entry for that location. For example, a log entry may be recorded periodically, such as every 0.1 seconds. The log data may be transmitted to the server as it is collected or the user may select to transmit the data once the user has finished walking through the indoor space.

In addition to the operations described below and illustrated in the figures, various operations will now be described. It should also be understood that the following operations do not have to be performed in the precise order described below. Rather, various steps may be handled in a different order or simultaneously. Steps may also be omitted unless otherwise stated.

A user may sign up or opt to participate (a "participant") in walking his or her client device through the indoor space and generate a time-indexed log as described above. Participants may be required to take an affirmative step in order to select or "opt-in" to participate. For example, participants may be required to sign in to a service before receiving the route or providing any information. Participants may be paid for the data provided and may also be provided with an explanation of how and why their feedback is being used. Similarly, participants may be provided with the opportunity to cease participation temporarily or permanently at any time.

After opting to participate, the participant's client device may record the time-indexed log of measurements. Again this data may be transmitted to the server as it is collected or the participant may select to transmit the data once the participant has finished walking through the indoor space.

Figure 3:
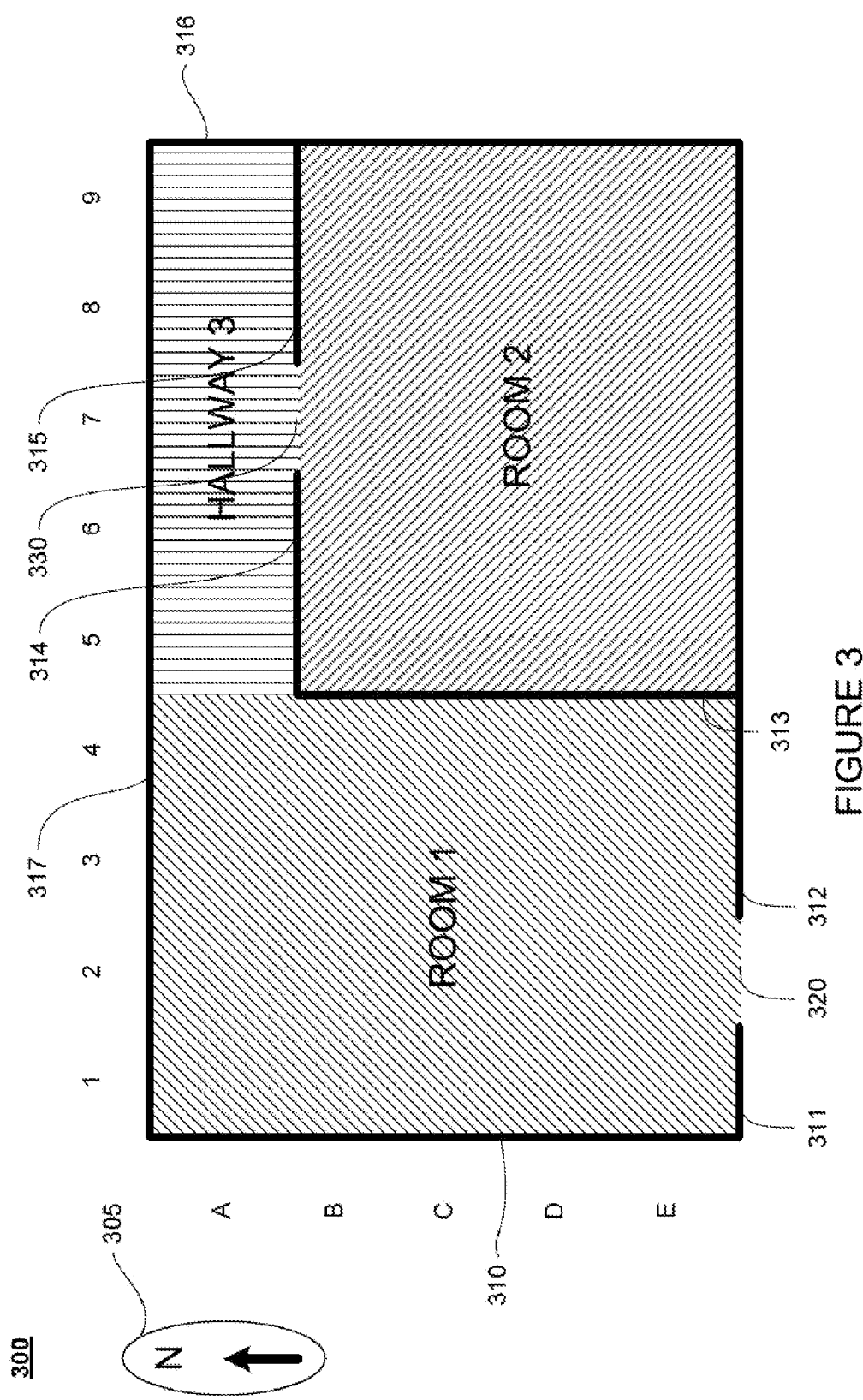
FIG. 3 is a map of an indoor space in accordance with an exemplary embodiment.

Once the time-indexed log is received, the server may identify a map of the indoor space through which the participant walked. In one example, the map may include a series of walls representing locations where a user may not walk within a building. As shown in FIG. 3, map 300 may include a plurality of walls 310-317 defining the spaces, such as rooms 1 and 2 and hallway 3, in which a user may walk (or rather in which a client device may be located), entrance/exit 320, and doorway 330. In this example, the map may include a coordinate system, A-E and 0-9, where the distance between coordinates of the same axis represent 1 meter. The map may also include a map pointer 305 which indicates the orientation of the map.

Figure 5:
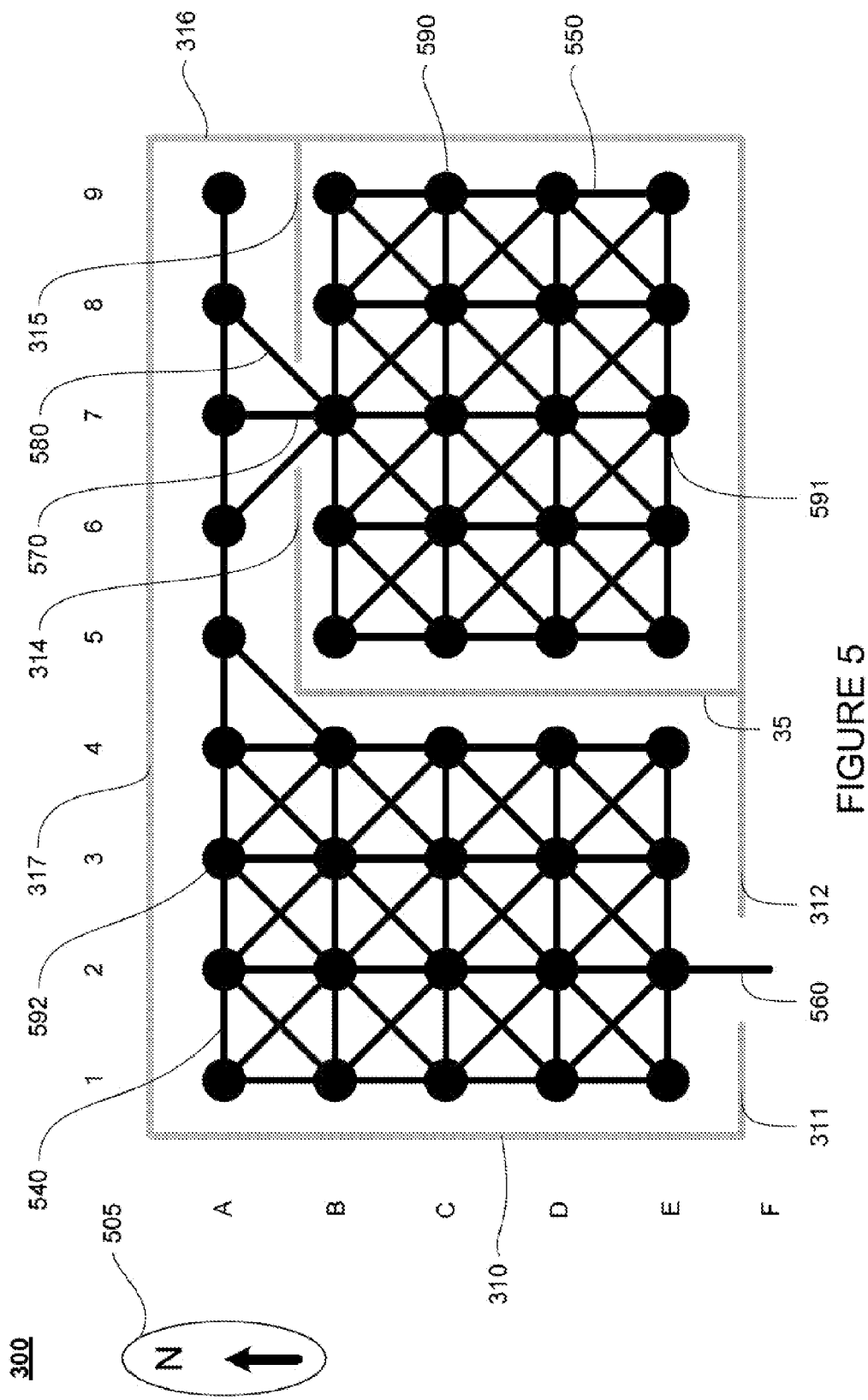
FIG. 5 is yet another map of the indoor space in accordance with an exemplary embodiment.

In another example, shown in FIG. 5, map 500 may include a coordinate system, A-F and 0-9, where the distance between coordinates of the same axis represents a fixed spacing, e.g., 1 meter. Rather than being defined by walls as in map 300, map 500 may include a plurality of rails, such as rails 540, 550, 560, and 570, representing paths along which a user may walk within the building. Each rail may be associated with an identifier. Here, the rails may be identified based on the coordinates associated with the end points. Thus, rail 550 may be identified as rail A1-A2 or A2-A1, rail 550 may be identified as rail D9-E9 or E9-D9, rail 560 may be identified as rail E2-F2 or F2-E2, etc.

The features of map 500, though visually different from maps 300-400 and 800-1200, may define the same indoor space as maps 300-1100. The grayed lines 510-517 represent walls 310-317 which are no longer included in map 500. For example, rails 570 and 580 may represent paths through doorway 330 and rail 560 may represent a path through entrance/exit 320. The map may also include a map pointer 505 which indicates the orientation of the indoor space.

Figure 4:
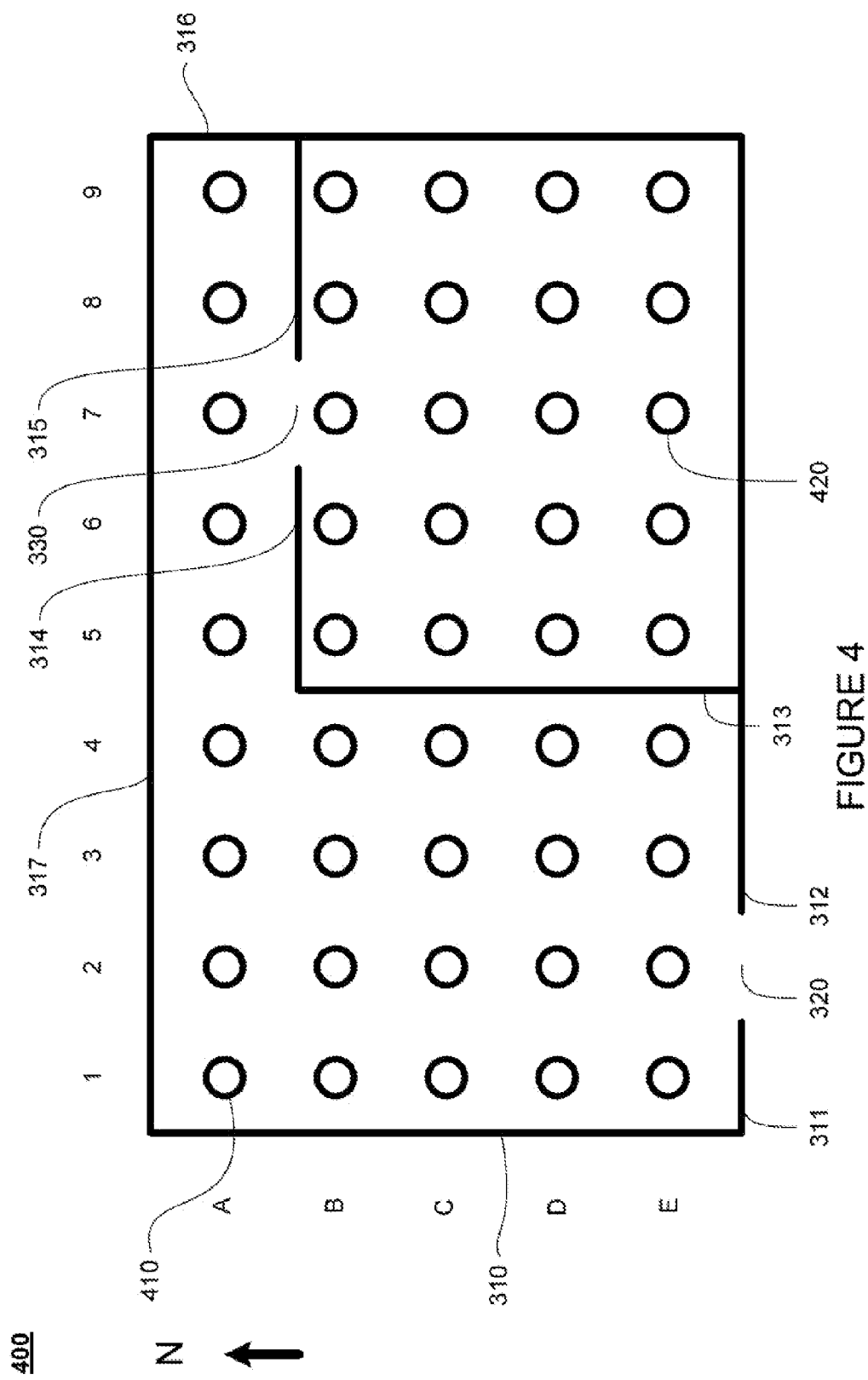
FIG. 4 is another map of the indoor space in accordance with an exemplary embodiment.

The server may populate the map with representative particles. Each particle may represent a possible location of the client device. It will be understood that a map need not actually be "filled" with particles. The particles may simply be generated as a list or table of data points each representing a possible location of the client device and various other attributes. As shown in FIG. 5, map 500 includes a plurality of particles, each representing a map coordinate at which the client device could be located and a value indicative of the likelihood that the client device is at that particular map coordinate (a "likelihood value"). For example, particle 510 represents map coordinate A1 and particle 520 represents map coordinate E7. Similarly, as shown in FIG. 4, map 400 also includes a plurality of particles, represented by the black circles, such as particle circles 490-492, on the rails. Each of the particles may also be identified by its respective coordinates; particle circle 490 as C9, particle circle 491 as E7, and particle circle 492 at A3.

It will be understood that the number, size, and placement of the particles of FIGS. 4 and 5 are merely exemplary. The greater the number of particles used, the greater the level of accuracy of the location estimation. In addition, larger spaces may require a greater number of particles. For example, particles may be generated in a ratio of roughly 2 particles per square foot. Thus, a space of roughly 500 square feet may be populated with 1000 particles, whereas another space of roughly 300 square feet may be populated with 600 particles. Further, each particle may represent a point or an area (e.g., 1 square foot).

Again, although FIGS. 4 and 5 depict the particles as evenly dispersed throughout maps 400 and 500, the particles may be arranged in various ways. For example, particles may be assigned locations randomly or clumped together in locations where an individual is most likely to be located. Returning to FIG. 3, more particles per some area (e.g., a square foot or meter) may be associated with locations in room (a large open space) as opposed to hallway 2 (a long narrow hallway). Similarly, more particles per some area may be located towards the center of room 2 as towards the outer edge of room 2 (along the walls 312-316.)

As the user walks or moves around an indoor space, the client device's movements may be tracked by one or more orientation devices. For example, as described above, the accelerometer or gyroscope may be used as a pedometer to determine when the user is moving. Accordingly, the server may be able to estimate the heading and speed of the client device based on information from the orientation device stored in the time-indexed log.

After determining the client device's movements based on the data from the orientation device, the effect of the movements on each of the particles may be determined. For example, as shown in map 400 of FIG. 4, if the client device has moved east 1 meter, each particle may be "moved" east 1 meter. Thus, the particle representing A1 may be "moved" to location A2, or rather the particle's representative location may be changed. In another example, if a particle is located at (x,y) at time t1 and the client device moves a small change in the x-direction ($\Delta X$) and a small change in the y-direction ($\Delta y$) between time t1 and time t2, at t2 the particle is located at $(x+\Delta X, y+\Delta y)$.

After each particle is "moved" based on the direction and speed of movement of the client device, the likelihood values may also be adjusted based on whether the particle has violated the constraints of a feature, for example by running into a wall or moving away from a rail. Particles may be rewarded or penalized by adjusting the likelihood value each time the client device detects that it is moving. For example, referring to FIG. 4, if a particle at location B4 is moved 1 meter to the east, the particle would run into wall 313. The particle's likelihood value may be penalized, for example, reduced. If a particle does not move into a wall, the particle may be rewarded. In another example, referring to FIG. 5, at location B4, there is no rail extending east for 1 meter. Thus, if particle B4 were to move 1 meter to the east, it would move off of (or away from) the rails. Again, the particle's likelihood value may be reduced. If a particle has not moved off of a rail the particle may receive a higher reward (or a lower penalty) than if it had.

Various valuation systems may be used to affect a similar result. For example, a similar system may also be used where particle values are increased when a particle moves through a wall or away from the rails.

If a particle at location E2 is moved 1 meter south, the particle will have moved through entrance/exit 320. If this particle were to represent an actual location of the client device, the client device would have moved through entrance/exit 320. Accordingly, the client device would then be outside of the building. Once outside, the client device would likely be able to receive at least some GPS signals. The GPS signals may be used to identify a current location of the client device. Accordingly, the client device may stop recording the time-indexed log and transmit the log to the server for processing.

Every so often the particles may be resampled with replacement to generate a new generation of particles. For example, based on the time-indexed log, each time a new step has been taken or a period of time has passed, the particles may be redistributed in a new generation of particles. The resampled set of particles may be selected based on the likelihood values associated with the previous set of particles.

For example, returning to FIG. 5, after taking one step to the East, the particles at locations B5 through E5 may be penalized for passing through wall 313. Similarly, the particles at locations B4 through E4 may be rewarded for passing through wall 313. Thus, the particle now located at location B4 may be associated with a greater likelihood value than the particles now located at B5 through E5. When the particles are resampled (or redistributed), the particle at location B4 may be more likely to be selected for the new generation than the particle at B5. This new generation of particles may be associated with likelihood values which are adjusted based on the movements detected by the orientation device. After some period of time or some number of steps, the particles may be resampled again and a new generation of particles may be generated as described above.

Particles may be selected for resampling based on these values until the new generation includes the same number of particles as the previous generation. For example, in FIGS. 4 and 5, there are 45 particles. After a step has been taken, 45 particles will be selected. Particles with higher likelihood values are more likely to be selected, and may be selected multiple times. For example, there may be 5 total particles S, T, U, V, and W, where S=(Xs, Ys), T=(Xt, Yt), U=(Xu, Yu), V=(Xv, Yv), and W=(Xw, Yw). Each of these particles may be associated with likelihood values of 5, 10, 5, 1, and 1, respectively. S is likely to be selected 5/17 of the times, while T is likely to be selected 10/17 times, etc. So, for example, particle T may be selected three times while particles S and U may be selected twice. In another example, particle T may be selected twice while particles S and U are selected once, and particle W is selected once.

Each particle selected during the resampling is then given some small degree of change. For example, a new particle may be generated by adding a small, random number to both the x and y components of a selected particle' position. For example, if the particle located at T=(Xt, Yt) is selected twice, two new "child" particles may be generated with some slight adjustment to the location (x and y values) of the selected particle. In this example, the results may be T1=(Xt1, Yt1) and T2=(Xt2, Yt2), where Xt1 and Xt2 represent some slight change from Xt and Yt1 and Yt2 represent some slight change from Yt. By adding this slight noise to each new particle, the system may automatically adjust for slight errors in the orientation device calculations, etc.

For the purpose of simplicity, the examples above use particles representing only spatial coordinates. However, particles may not only represent possible locations of the client device, but also possible headings. In this case, the initial set of particles may reflect not only a variety of starting positions, but a variety of initial headings as well. Headings may also be used to adjust the likelihood value as discussed above. For example, as shown in FIG. 6, a set of particles may initially represent one or more map locations. The 8 particles may represent a single or multiple locations each with a slightly different heading. If the client device's compass or other orientation device is used to determine that the client device is moving east, particles associated with a heading other than east may be penalized by adjusting the likelihood value of particles downwards while particles with the heading East may be rewarded by adjusting their associated likelihood value upwards. Thus, particle 3 may be rewarded and particles 1-2 and 4-8 may be penalized and their associated likelihood values adjusted accordingly.

When the particles are resampled, particles associated with a heading closest to the heading determined from the data from the compass or other orientation device may have a higher likelihood value and may be more likely to be selected for the newest generation. Again, any child particles generated may include a slight heading change from the parent. Returning to the example above, particle T may also include a heading Ht, such that T=(Xt, Yt, Ht). A child particle generated from T may be T1'=(Xt1, Yt1, Ht1), where Xt1 represent some slight change from Xt, Yt1 represents some slight change from Yt, and Ht1 represents some slight change from Ht.

Other signals, such as wireless network access point signals or cellular tower triangulation positioning, may also be used to adjust the likelihood value of particles. For example, a map of an indoor location may include the location and signal strengths of one or more wireless network access points. These access points may transmit beacon messages including data such as a Media Access Control ("MAC") address identifying the access point. These beacon messages may be received and recorded by the client device in order to adjust likelihood values. It will be understood that any wireless network data received by the client device may be limited to the identification information and signal strengths and need not contain additional information. For example, information contained in the network traffic, such as personal information, need not be collected, and in fact, may actually be removed in order to protect the privacy of the wireless network's users.

For example, if the client device is in a location which receives a beacon message from a wireless network access point according to the map, the client device may include this information in the time-indexed log. Particles representing locations not within range of the wireless network access point according to the map may be penalized. Similarly, particles which are within the range of the wireless network access point according to the map may be rewarded. Again, particles associated with a higher likelihood value are less likely to be removed or alternatively, more likely to be resampled.

As discussed above, each resampling may result in a new generation of particles. The new generation of particles is based on the previous generation of particles. For each particle generated, the data from the previous generation may be associated with the new generation such that each particle may be traced back to the first generation of particles initially used to populate the map. This data may be stored in a table, database, or other form of memory.

Table 700 of FIG. 7 is an exemplary partial table for tracking multiple generations of particles. In this example, after resampling the particles twice, there may be 3 generations of particles, a child generation, a parent generation and a grand parent generation. For clarity, the able does not include columns for the likelihood values or the original location of the grand parent particles; however, this data may also be included as well as other information. As shown in FIG. 7, child particles 1 and 2 share the same parent particle, parent 1, which is a child of grand parent particle 1. Each time a particle selected for resampling, its characteristics (location and heading) may be given a slight change represented by σx, σy, and σh. It will be understood that although only σx, σy, and σh are shown in the table, each σ may represent a different value in different cells. Before sampling, the location and heading of grand parent particle 1 may be (x1,y1) and h1. During resampling, grand parent particle 1 may be selected and used to generate parent particle 1. Parent particle 1's location and heading are thus associated with a slight change (σx, σy, and σh) from grand parent particle 1.

As described above, the changes to the heading and location of the client device before resampling may be applied to the location and heading of parent particle 1. For example, at the time of resampling, the change in the parent particle's x-coordinate, y-coordinate, and heading may be represented by Δx, Δy, and Δh. Unlike the σ values described above, the Δ values may be the same value between different cells of the table.

In this example, at resampling, parent 1 may be selected at least twice in order to generate the child generation. Each selection is used to generate a new child particle, here child 1 and child 2. The location and headings of both particles are given a slight change (σx, σy, and σh) from the location and heading of parent 1. Again, between child 1 and child 2, one or more of σx, σy, and σh may be different.

As additional data from the one or more orientation devices is applied to the particles of the newest generation and the particles are resampled to generate additional generations, this data may also be stored as described in the examples above.

Figure 8:
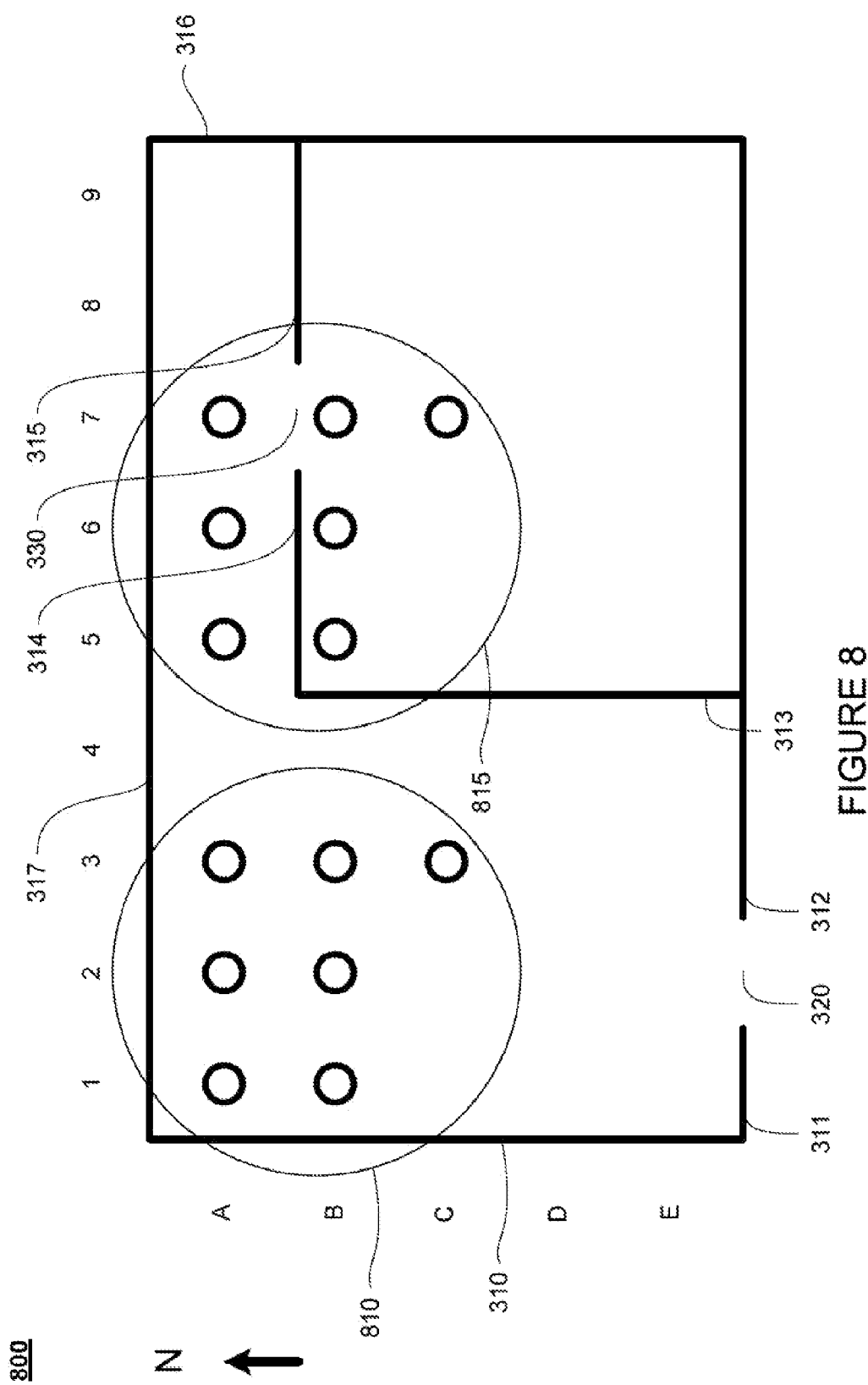
FIG. 8 is a map of the indoor space in accordance with an exemplary embodiment.

As the particles are moved around the space and resampled, they may converge into groups. This grouping may be referred to as "clustering." As shown in map 800 of FIG. 8, the particles have converged to two major clusters, cluster 810 and cluster 815. Although fewer than 45 particles are shown for clarity, it will be understood that because of the resampling with replacement, the total number of particles may not actually change.

Figure 9:
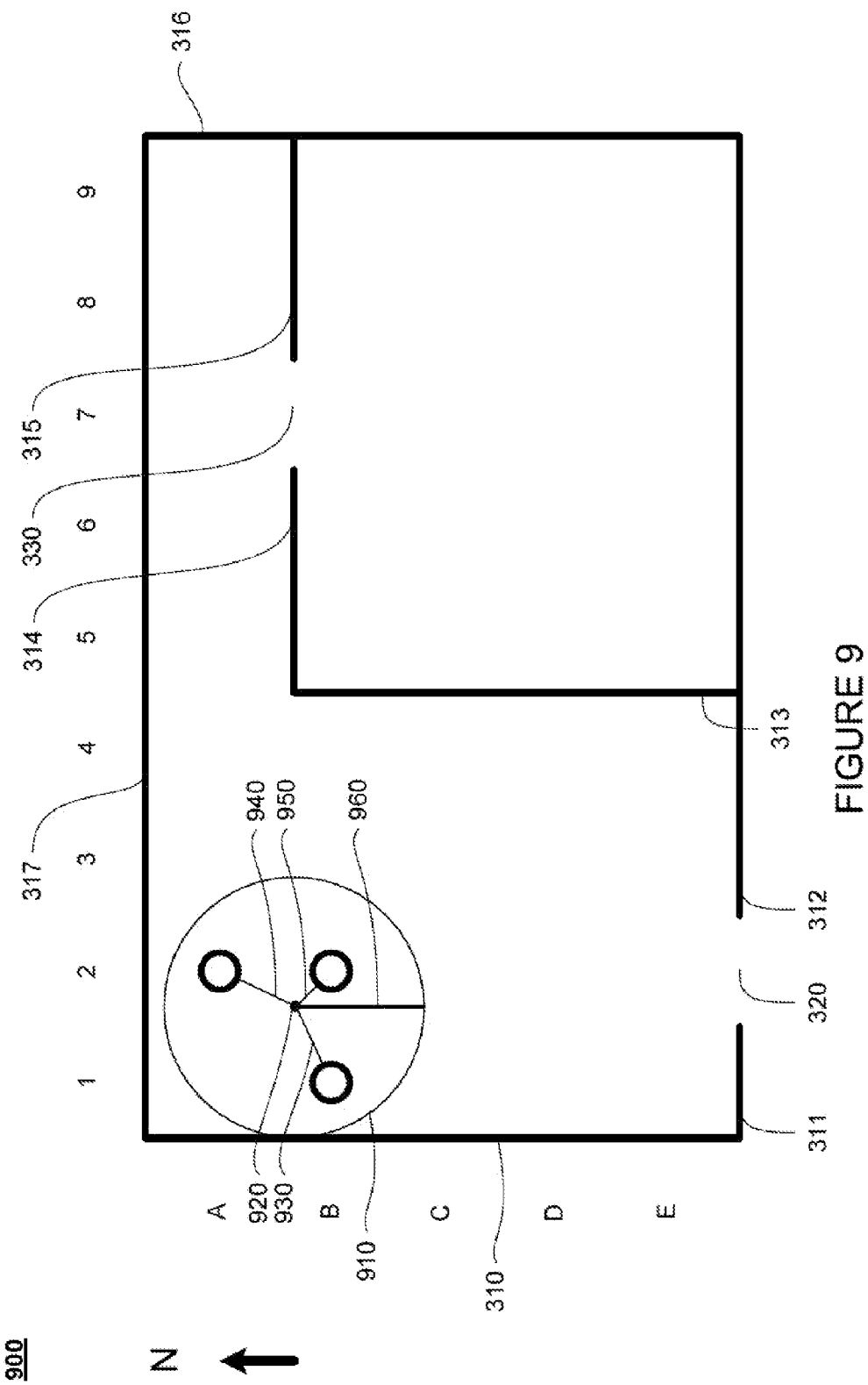
FIG. 9 is another map in accordance with an exemplary embodiment.

After subsequent resampling and adjustment to the locations associated with each of the particles, eventually all of the particles may be within some small, for example a few meters or less, radius of one another. For example, as shown in FIG. 9, the remaining particles have converged to a single cluster, cluster 910. Again, although fewer than 45 particles are shown for clarity, it will be understood that because of the resampling with replacement, the total number of particles may not actually change. Cluster 910 includes 3 representative particles, particles B1, A2, and B2. These particles are all within radius 960.

The mean location of the clustered particles is then determined. The particle representing a location closest to the mean location of the remaining particles may be identified as an actual location of the client device. This actual location of the client device may be a current location of the client device if the processing is done in real time at the client device, for example, if the time-indexed log is analyzed by the client device and not the server. It may also be a prior location of the client device, for example, if the information is transmitted to a server and the processing performed at a later time. Similarly, if the particles also represent possible headings of the client device, the representative heading of the identified particle may be identified as an actual (or current) heading of the client device.

As shown in the example of FIG. 9, the mean location of particles B1, A2, and B2 is mean location 920. Particles B1, A2, and B2 are located distances 930, 940, and 950, respectively from location 920. As distance 950 is the shortest among all of the distances, particle B2 may be identified as an actual location of the client device.

Once, an actual (or current) location of a client device is determined, the path that the client device took through the indoor space may also be determined. By using a table or other memory system to record the changes and previous generations for each new generation as described above, the path of the client device may be determined by reference to the stored data. For example, returning to FIG. 7, if child particle 1 is identified as a location of the client device, the locations and headings of parent 1 and grand parent 1 may be used to identify the path of the client device.

After the path has been identified, it may be stored by the server. If the path has been identified at the client device, the path may first be transmitted to the server. Because of the amount of processing power required to identify an actual location of a client device, transmitting the time-indexed log to the server in order to have the server perform the processing may preserve the client device's processing and power resources. Accordingly, the server may have access to a plurality of time-indexed logs as well as a plurality of paths through the same indoor space.

Figure 10:
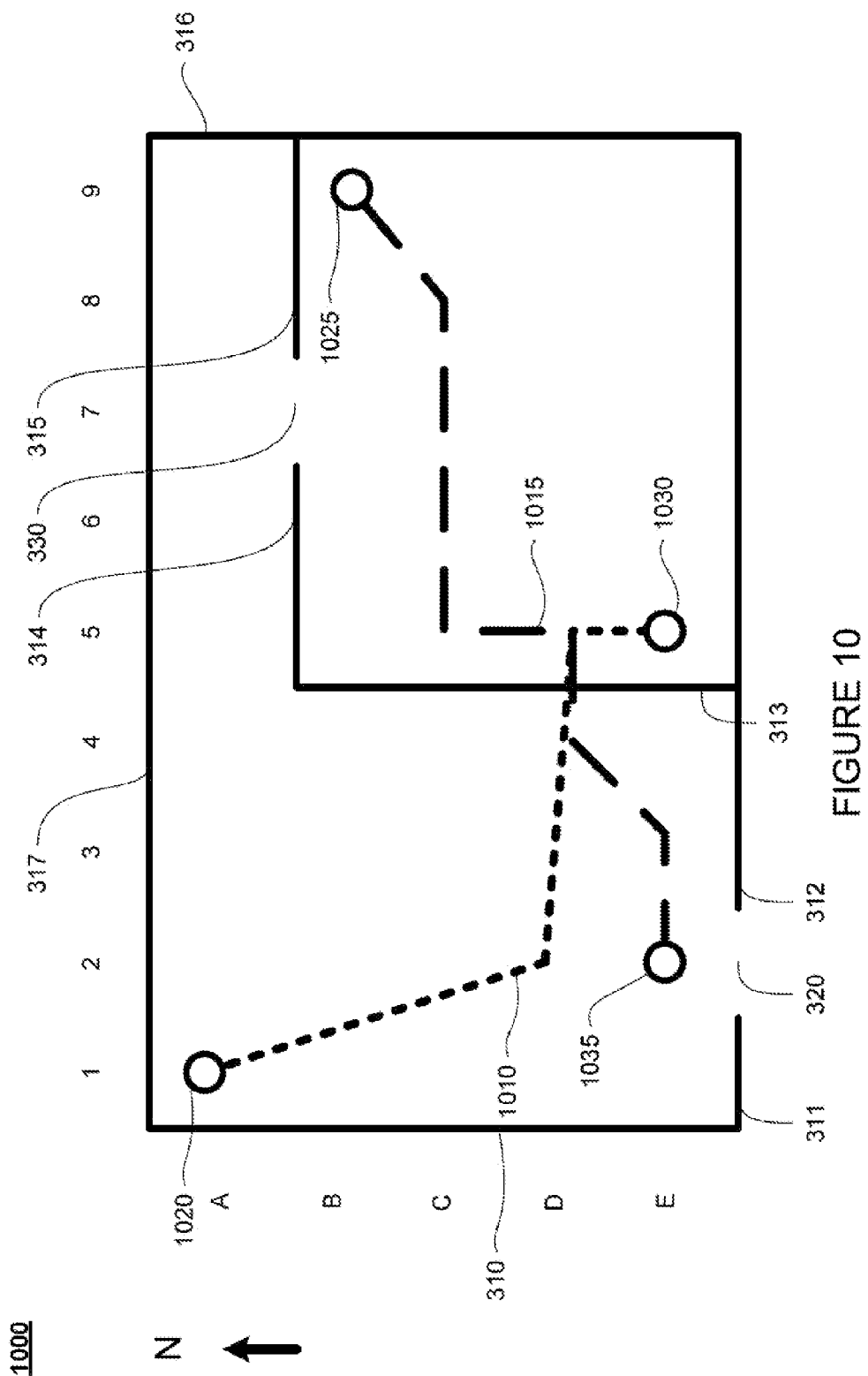
FIG. 10 is yet another map in accordance with an exemplary embodiment.

The server may compare the identified paths to the map of the indoor space. For example, map 1000 of FIG. 10 depicts two identified paths through an indoor space. Path 1010 includes starting point 1020 and ending point 1030. Path 1015 includes starting point 1025 and ending point 1035.

By comparing the identified paths to the map, the server may identify common inconsistencies with the paths or patterns. For example, turning to FIG. 11, both path 1010 and 1015 pass through wall 313 at location 1110. In addition, both paths follow a similar pattern by moving around (rather than through) area 1120.

These inconsistencies and patterns may then be used to supplement or update the map. The features of a given map may be changed, for example, by adding or removing walls or rails, changing the location of a particular wall or rail, or adding new features, such as an object other than a wall. In one example, both paths 1010 and 1015 pass through wall 313 of FIG. 11. Accordingly, as shown in map 1200 of FIG. 12, wall 313 may be adjusted to include an opening 1210 through wall 313 based on area 1110 of FIG. 11 through which paths 1010 and 1015 pass. In another example, the indoor space included in area 1120 of FIG. 11 may actually be an object such as a desk or other obstacle through which a person is not able to walk. In this example, as shown in map 1200 of FIG. 12, a new feature, feature 1220 may be included in the map to represent an object which both paths 1010 and 1015 moved around.

Figure 11:
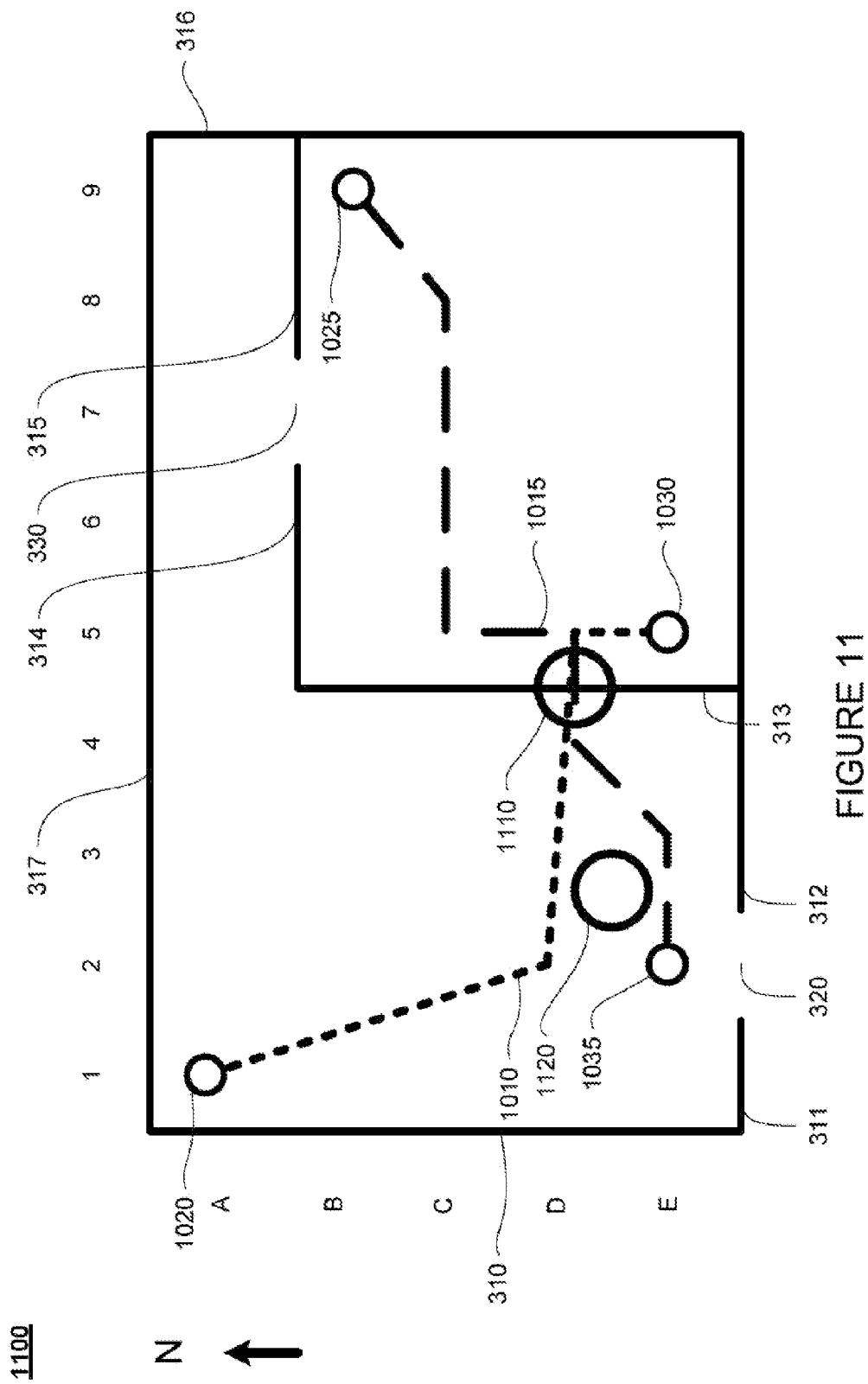
FIG. 11 is a further map in accordance with an exemplary embodiment.
Figure 12:
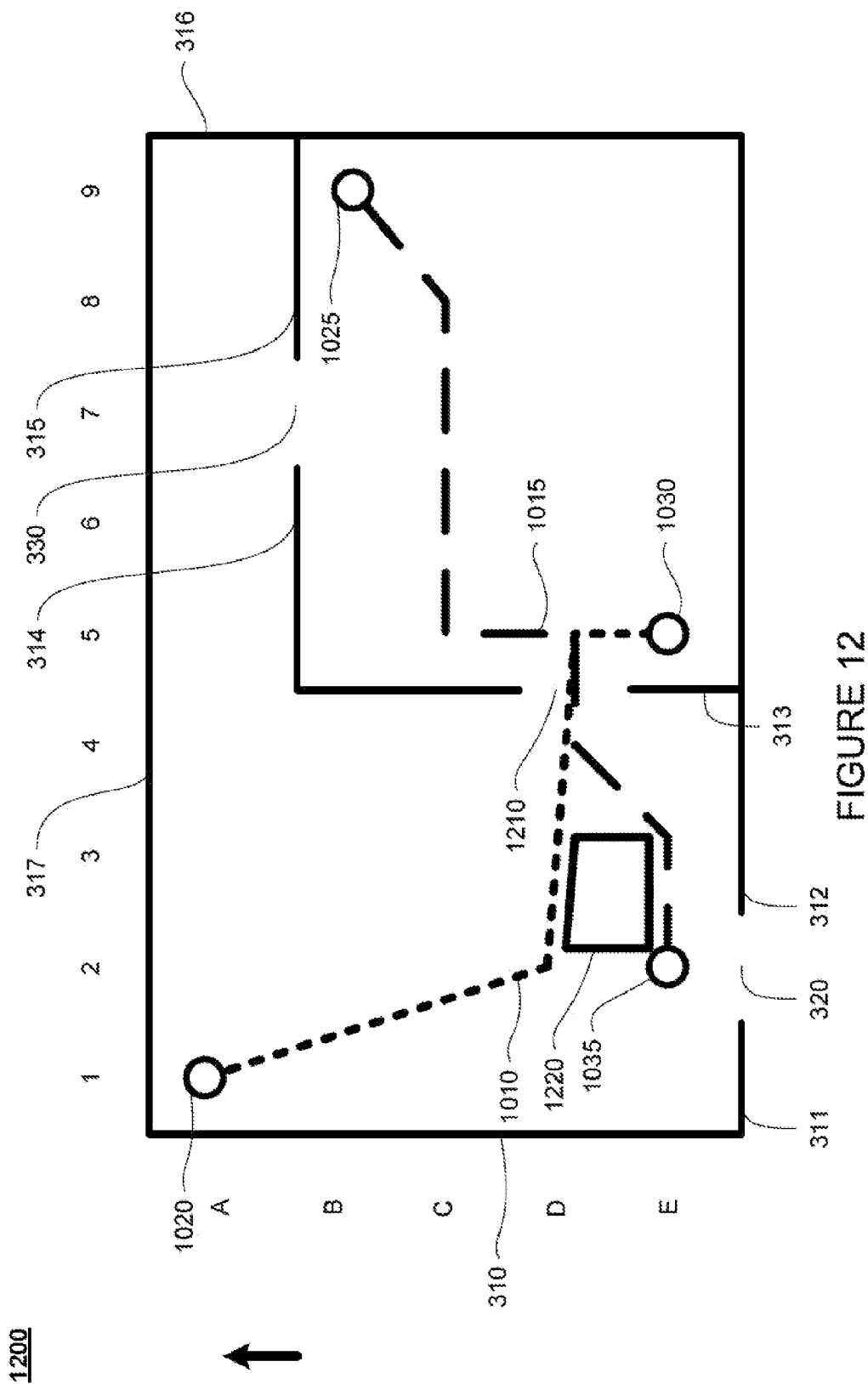
FIG. 12 is another map in accordance with an exemplary embodiment.

For clarity, the examples of FIGS. 10-12 include only two paths, however it will be appreciated that the greater the number of paths used, it may become simpler to identify common inconsistencies or patterns, and the greater the accuracy of the resulting changes to the map.

These changes to the map may be used to keep the map up to date with the most current information about the indoor space. For example, even minor changes to the indoor space, such as moving furniture or rearranging cubicles in an office may require changes to the map. For example, removing a portion of a temporary office partition would allow people to travel through what would appear to be a wall in the map.

Figure 13A:
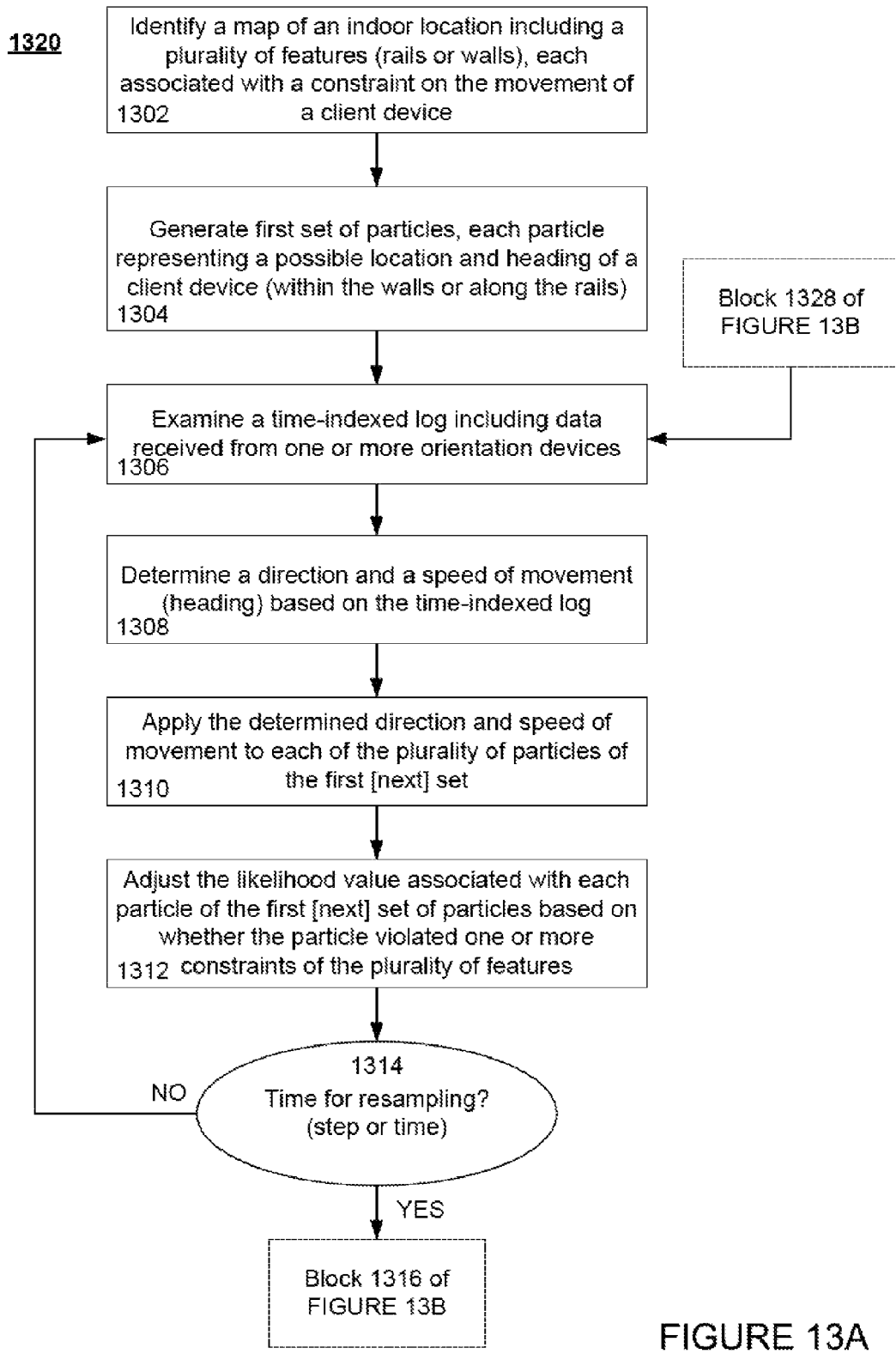

Exemplary flow diagram 1300 of FIGS. 13A, 13B, and 13C depicts aspects of the processes described above. For example, at block 1302, a map of an indoor location including a plurality of features is accessed by a server. As described above the features may include walls or rails. At block 1304, the map is populated with a plurality of particles. Each particle represents a possible location of the client device with respect to the map. In some examples, the particles may also represent a possible heading of the client device. Each particle is also associated with a likelihood value indicative of how likely it is that the client device is at the representative location.

The server accesses a time-indexed log including data from one or more orientation devices at block 1306. The orientation devices may include for example, accelerometers, gyroscopes, compasses, etc. The time-indexed log is used to determine a direction of movement (a heading) and a speed of movement at block 1308. The determined direction and speed are applied to each of the plurality of particles at block 1310. The likelihood value associated with each particular particle is then adjusted based on whether the particular particle would violate a constraint of a feature of the map, for example by contacting or moving through a wall or moving off of a rail, at block 1312. In some examples, the likelihood values may be adjusted based on whether the particles' headings are consistent with the determined heading. Again, as noted above, other signals may also be used to adjust the likelihood values.

At block 1314, it is determined whether it is time to resample. For example, the server or client device may determine whether or not a step has been taken or whether some period of time has passed based on the time-indexed log. If not, the process returns to block 1306 and additional data from the one or more orientation devices is examined. If it is time to resample, the process continues at block 1316 of FIG. 13B where a plurality of particles of the first set of particles is selected based on the associated likelihood values. A new (or next new) set of particles is then generated by adjusting the representative location (and in some examples, heading) of the selected particles by some minimal value at block 1318. For each particle of the new (or next new) set of particles, information identifying the selected particle of the previous set used to generate the particular particle is stored at block 1320.

At block 1322, it is determined whether all of the particles of the next set of particles are within some threshold distance from one another or threshold radius. If not, the process returns again to block 1306 of FIG. 13A and additional data is received from the orientation device, etc. If all of the particles of the next set are within a threshold radius, a mean representative location of the particles of the next set of particles is determined at block 1324. The particle representing the location closest to the mean representative location is then selected at block 1326. A path through the indoor space is determined based on the information identifying the selected particle or particles of the previous set or sets used to generate the selected particle at block 1328.

Moving to block 1330 of FIG. 13C, the server stores a plurality of determined paths (such as those determined at block 1328 of FIG. 13B) in memory. Each path of the stored plurality of determined paths is compared to the map in order to identify common inconsistencies or patterns at block 1332. The map is then changed, by making one or more changes to the plurality of features based on the identified common inconsistencies or patterns at block 1334. Again, as described above, the feature changes may include adding, subtracting, adjusting the features etc.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. A method of updating a map of an indoor space, the map being based on a plurality of features, the method comprising:

determining a plurality of paths of a portable handheld device through the indoor space, wherein determining each particular path of the plurality of paths includes:
generating, by a processor, a first set of particles, each particle of the first set of particles representing a location on the map and being associated with a likelihood value, and wherein each particle of the first set of particles further represents a device heading;
receiving data from one or more orientation devices;
determining a direction and speed of movement based on the received data;
identifying a heading based on the received data;
applying the direction and speed of movement to each one of the first set of particles;
adjusting the likelihood value of each particle of the first set of particles, based on whether the particular particle violated one or more of the plurality of features and whether the heading associated with each particular particle is associated with a heading consistent with the identified heading;
generating a second set of particles by selecting particles of the first set of particles based on the likelihood values associated with the first set of particles and adjusting the representative locations of the selected particles of the first set by a minimal value;
for each particular particle of the second set of particles, storing information identifying the particle of the first set selected to generate the particular particle of the second set;
if all of the particles of the second set of particles are within a threshold radius of one another, selecting a given particle of the second set of particles closest to an average representative location of the second set of particles; and
determining the particular path based on the stored information identifying the particle of the first set selected to generate the selected given particle of the second set;
storing the plurality of determined paths in memory;
comparing each path of the stored plurality of determined paths to the map to identify common patterns; and
updating the map by making one or more changes to the plurality of features based on the identified common patterns.

2. The method of claim 1, wherein the plurality of features are walls which define areas where a user may not pass through.

3. The method of claim 2, wherein the one or more changes include adding a wall to the map.

4. The method of claim 2, wherein the one or more changes include adjusting a wall.

5. The method of claim 2, wherein the one or more changes include adding a feature representing an object to the map.

6. The method of claim 1, wherein the plurality of features are rails which define areas where a user is permitted to go.

7. The method of claim 6, wherein the one or more changes include adding a rail to the map.

8. The method of claim 6, wherein the one or more changes include adjusting a rail.

9. The method of claim 1, wherein the first set of particles and the second set of particles each includes the same number of particles.

10. The method of claim 1, wherein each particle of the first set of particles further represents a possible heading of the portable handheld device, and the method further comprises, for each particular particle of the second set of particles, storing information identifying the representative heading of the particle of the first set selected to generate the particular particle.

11. The method of claim 1, further comprising for each particular particle of the second set of particles, storing information identifying the representative location of the particle of the first set selected to generate the particular particle of the second set.

12. A device for updating a map of an indoor space, the device comprising:
  memory storing the map of the indoor space, the map being based on a plurality of features; and
  a processor coupled to the memory, the processor being configured to:
    determine a plurality of paths of a portable handheld device through the indoor space, by:
      generating a first set of particles, each particle of the first set of particles representing a location on the map and being associated with a likelihood value, and wherein each particle of the first set of particles further represents a device heading;
      receiving data from one or more orientation devices;
      determining a direction and speed of movement based on the received data;
      identifying a heading based on the received data;
      applying the direction and speed of movement to each one of the first set of particles;
      adjusting the likelihood value of each particle of the first set of particles, based on whether the particular particle violated one or more of the plurality of features and whether the heading associated with each particular particle is associated with a heading consistent with the identified heading;
      generating a second set of particles by selecting particles of the first set of particles based on the likelihood values associated with the first set of particles and adjusting the representative locations of the selected particles of the first set by a minimal value;
      for each particular particle of the second set of particles, storing, in the memory, information identifying the particle of the first set selected to generate the particular particle of the second set;
      if all of the particles of the second set of particles are within a threshold radius of one another, selecting a given particle of the second set of particles closest to an average representative location of the second set of particles; and
      determining the particular path based on the stored information identifying the particle of the first set selected to generate the selected given particle of the second set;
    store the plurality of determined paths in memory;
    compare each path of the stored plurality of determined paths to the map to identify common patterns; and
    update the map by making one or more changes to the plurality of features based on the identified common patterns.

13. The device of claim 12, wherein the plurality of features are walls which define areas where a user may not pass through.

14. The device of claim 13, wherein the one or more changes include adding a feature representing an object to the map.

15. The device of claim 12, wherein the plurality of features are rails which define areas where a user is permitted to go.

16. The device of claim 15, wherein the one or more changes include adding a rail to the map.

17. The device of claim 15, wherein the one or more changes include adjusting a rail.

18. The device of claim 13, wherein the one or more changes include adding a wall to the map.

19. The device of claim 13, wherein the one or more changes include adjusting a wall.

20. The device of claim 12, wherein the first set of particles and the second set of particles each includes the same number of particles.

21. The device of claim 12, wherein each particle of the first set of particles further represents a possible heading of the portable handheld device, and the processor is further operable to, for each particular particle of the second set of particles, store, in the memory, information identifying the representative heading of the particle of the first set selected to generate the particular particle.

22. The device of claim 12, wherein the processor is further operable to, for each particular particle of the second set of particles, store, in the memory, information identifying the representative location of the particle of the first set selected to generate the particular particle of the second set.

23. A tangible, non-transitory, computer-readable storage medium on which computer readable instructions of a program are stored, the instructions, when executed by a processor, cause the processor to perform a method of updating a map of an indoor space the map being based on a plurality of features, the method comprising:
  determining a plurality of paths of a portable handheld device through the indoor space, wherein determining each particular path of the plurality includes:
    generating a first set of particles, each particle of the first set of particles representing a location on the map and being associated with a likelihood value, and wherein each particle of the first set of particles further represents a device heading;
    receiving data from one or more orientation devices;
    identifying a heading based on the received data;
    determining a direction and speed of movement based on the received data;
    applying the direction and speed of movement to each one of the first set of particles;
    adjusting the likelihood value of each particle of the first set of particles, based on whether the particular particle violated one or more of the plurality of features and whether the heading associated with each particular particle is associated with a heading consistent with the identified heading;
    generating a second set of particles by selecting particles of the first set of particles based on the likelihood values associated with the first set of particles and adjusting the representative locations of the selected particles of the first set by a minimal value;
    for each particular particle of the second set of particles, storing information identifying the particle of the first set selected to generate the particular particle of the second set;
    if all of the particles of the second set of particles are within a threshold radius of one another, selecting a given particle of the second set of particles closest to an average representative location of the second set of particles; and
    determining the particular path based on the stored information identifying the particle of the first set selected to generate the selected given particle of the second set;
  storing the plurality of determined paths in memory;
  comparing each path of the stored plurality of determined paths to the map to identify common patterns; and
  updating the map by making one or more changes to the plurality of features based on the identified common patterns.

* * * * *